(12) United States Patent
Garrett, Jr. et al.

(10) Patent No.: US 11,561,702 B2
(45) Date of Patent: Jan. 24, 2023

(54) USING PATH QUARANTINING TO IDENTIFY AND HANDLE BACKEND ISSUES

(71) Applicant: EMC IP Holding Company LLC, Hopkinton, MA (US)

(72) Inventors: Wayne E. Garrett, Jr., Bellingham, MA (US); Gerry Fredette, Bellingham, MA (US); Brion Patrick Philbin, North Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 279 days.

(21) Appl. No.: 17/085,033

(22) Filed: Oct. 30, 2020

(65) Prior Publication Data

US 2022/0137830 A1 May 5, 2022

(51) Int. Cl.
| | |
|---|---|
| *G06F 3/06* | (2006.01) |
| *G06F 11/30* | (2006.01) |
| *G06F 11/07* | (2006.01) |
| *G06F 11/10* | (2006.01) |

(52) U.S. Cl.
CPC ............ *G06F 3/0619* (2013.01); *G06F 3/067* (2013.01); *G06F 3/0622* (2013.01); *G06F 3/0635* (2013.01); *G06F 3/0659* (2013.01); *G06F 3/0683* (2013.01); *G06F 11/0772* (2013.01); *G06F 11/1092* (2013.01); *G06F 11/3034* (2013.01)

(58) Field of Classification Search
None
See application file for complete search history.

(56) References Cited

U.S. PATENT DOCUMENTS

| | | | |
|---|---|---|---|
| 5,845,147 A | 12/1998 | Vishlitzky et al. | |
| 6,145,028 A | 11/2000 | Shank et al. | |
| 7,707,331 B1 | 4/2010 | Brown et al. | |
| 2016/0092292 A1 | 3/2016 | Lv et al. | |
| 2016/0179618 A1* | 6/2016 | Resch | H04L 67/1097 714/764 |
| 2018/0088809 A1 | 3/2018 | Liu et al. | |

* cited by examiner

*Primary Examiner* — Scott C Sun
(74) *Attorney, Agent, or Firm* — BainwoodHuang

(57) ABSTRACT

A technique involves, in response to encountering a predefined number of consecutive I/O errors using a drive path to a storage drive, transitioning the drive path from online to quarantined to temporarily deny further I/O operations from being processed using the drive path. The technique further involves starting a quarantine timer that defines a quarantine time period. The technique further involves performing an update operation that updates the drive path. The update operation (i) changes the drive path from quarantined to removed to continue denying further I/O operations from being processed using the drive path when a removal notification is received before the quarantine time period expires, and (ii) changes the drive path from quarantined to back to online to allow further I/O operations to be processed using the drive path when a removal notification is not received before the quarantine time period expires.

14 Claims, 6 Drawing Sheets

| | 420 | 430 | 440 |
|---|---|---|---|
| 410(1) | Drive Path 001 | Online | |
| 410(2) | Drive Path 002 | Online | |
| 410(3) | Drive Path 003 | Quarantined | |
| 410(4) | Drive Path 004 | Online | |
| | Drive Path 005 | Online | |
| | Drive Path 006 | Online | |
| | Drive Path 007 | Removed | |
| | Drive Path 008 | Removed | |
| | Drive Path 009 | Online | |
| | Drive Path 010 | Online | |
| | . . . | . . . | . . . |

FIG. 5

USING PATH QUARANTINING TO IDENTIFY AND HANDLE BACKEND ISSUES

BACKGROUND

A conventional data storage system includes storage nodes and storage devices. The storage nodes perform input/output (I/O) operations on the storage devices to manage data on behalf of one or more host computers.

Typically, each storage node has two paths to reach each storage device. If a storage node encounters a failure while performing an I/O operation on a storage device using a first path to that storage device, the storage node may retry the I/O operation on the storage device using the alternate path to that storage device.

There are a variety of reasons as to why an I/O operation on a storage device may fail. For example, the storage device itself may have failed. As another example, the storage device may be operating correctly, but a connector providing a portion of the path to the storage device may have failed. As yet another example, the storage device and the connector may be operating correctly, but the cable linking an enclosure containing the storage nodes to another enclosure containing the storage device may have failed or may have become disconnected.

SUMMARY

Suppose that each storage node manages path states using a data path application, a platform manager application and a system manager application. The data path application is responsible for updating a current path state to each storage device and running I/O error handling code to identify causes of I/O operation failures (e.g., to identify storage device errors, link errors, etc.). The platform manager application is responsible for detecting storage device and path failures as well as discovering when hardware (e.g., field replaceable units or FRUs) are added and removed. The system manager application, which may move between the storage nodes (e.g., in response to a failover event), communicates with the platform manager application on each storage node to aggregate states from both storage nodes and informs the data path applications on the storage nodes to update such states.

Further suppose that the data path application on a storage node encounters an I/O operation failure due to a backend cable disconnection or failure. In such a situation, the I/O error handling code may be unable to identify whether the failure is due to a storage device error or a link error, and then incorrectly indict the storage devices on the failed path as failing components. Next, the I/O error handling code may invoke recovery actions on the storage devices on the failed path which may lead to other issues and/or failures such as a fenced off storage node, system manager application failover, or even a data unavailable/data loss (DU/DL) event.

In contrast to the above-described conventional data storage system which is susceptible to incorrectly handling I/O operation failures, improved techniques are directed to using path quarantining to identify and handle backend issues. That is, storage processors may quarantine problematic paths long enough to determine where the issues lie. For example, in the context of storage processing circuitry having a system manager component, a platform manager component, and a data path component, the data path component moves a problematic path from an online state to a quarantined state for a period of time. While the problematic path is in the quarantined state, normal I/O operations are not performed using that path. Such quarantining allows time (i) for the platform manager component to identify a reason for I/O failure using that path and communicate the reason to the system manager component, and (ii) for the system manager component to notify the data path component to properly handle the I/O failure. Such operation prevents the data path component from prematurely indicting storage drives as the failing component thus avoiding possible unnecessary service interruptions.

One embodiment is directed to a method which is performed in a storage processor to control access to a storage drive using a quarantined state. The method includes, in response to encountering a predefined number of consecutive I/O errors using a drive path to the storage drive, transitioning a current state of the drive path from online to quarantined to temporarily deny further I/O operations from being processed using the drive path. The method further includes, in response to transitioning the current state from online to quarantined, starting a quarantine timer that defines a quarantine time period. The method further includes, after the quarantine timer is started, performing an update operation that updates the current state of the drive path. The update operation (i) changes the current state of the drive path from quarantined to removed to continue denying further I/O operations from being processed using the drive path when a removal notification is received for the drive path before the quarantine time period expires, and (ii) changes the current state from quarantined to back to online to allow further I/O operations to be processed using the drive path when a removal notification is not received for the drive path before the quarantine time period expires.

Another embodiment is directed to a computer program product having a non-transitory computer readable medium which stores a set of instructions to control access to a storage drive using a quarantined state. The set of instructions, when carried out by storage processing circuitry, causes the storage processing circuitry to perform a method of:

(A) in response to encountering a predefined number of consecutive input/output (I/O) errors using the drive path to the storage drive, transitioning a current state of the drive path from online to quarantined to temporarily deny further I/O operations from being processed using the drive path;

(B) in response to transitioning the current state from online to quarantined, starting a quarantine timer that measures a quarantine time period; and (C) after the quarantine timer is started, performing an update operation that updates the current state of the drive path, the update operation (i) changing the current state from quarantined to removed to continue denying further I/O operations from being processed using the drive path when a removal notification is received for the drive path before the quarantine time period expires, and (ii) changing the current state from quarantined to back to online to allow further I/O operations to be processed using the drive path when a removal notification is not received for the drive path before the quarantine time period expires.

Yet another embodiment is directed to data storage equipment having a set of storage processors. Each storage processor includes memory, and control circuitry coupled to the memory. The memory stores instructions which, when carried out by the control circuitry, cause the control circuitry to:

(A) in response to encountering a predefined number of consecutive input/output (I/O) errors using a drive path to a storage drive, transition a current state of the drive path from online to quarantined to temporarily deny further I/O operations from being processed using the drive path, (B) in response to transitioning the current state from online to quarantined, start a quarantine timer that measures a quarantine time period, and (C) after the quarantine timer is started, perform an update operation that updates the current state of the drive path, the update operation (i) changing the current state from quarantined to removed to continue denying further I/O operations from being processed using the drive path when a removal notification is received for the drive path before the quarantine time period expires, and (ii) changing the current state from quarantined to back to online to allow further I/O operations to be processed using the drive path when a removal notification is not received for the drive path before the quarantine time period expires.

In some arrangements, the data storage equipment further includes a plurality of storage drives which couples to the set of storage processors. Additionally, the set of storage processors includes at least two storage processors. Each storage processor has at least two drive paths to each storage drive of the plurality of storage drives.

In some arrangements, the data storage equipment further includes a set of host computer interfaces which couples to the set of storage processors. The set of storage processors is constructed and arranged to store host data within the plurality of storage drives on behalf of a set of host computers that communicate with the set of storage processors through the set of host computer interfaces.

In some arrangements, transitioning the current state of the drive path from online to quarantined includes setting, by data path circuitry of the storage processor, a current state entry of a control structure to quarantined. The data path circuitry is permitted to process I/O operations using the drive path when the current state entry of the control structure is set to online. Additionally, the data path circuitry is not permitted to process I/O operations using the drive path when the current state entry of the control structure is not set to online (e.g., when the current state is set to quarantined, removed, etc.).

In some arrangements, starting the quarantine timer that defines the quarantine time period includes setting, by the data path circuitry of the storage processor, the quarantine timer to cover:

a first amount of time for platform management circuitry of the storage processor to determine whether the drive path failed due to a failed storage drive or a failed link, (ii) a second amount of time for the platform management circuitry of the storage processor to provide a notification to system manager circuitry of the storage processor which communicates with both the data path circuitry of the storage processor and other data path circuitry of another storage processor, and (iii) a third amount of time for the system manager circuitry of the storage processor to provide the removal notification to the data path circuitry before the quarantine time period expires.

In some arrangements, performing the update operation that updates the current state of the drive path includes updating, by the data path circuitry of the storage processor, the current state entry of the control structure based on whether the data path circuitry of the storage processor received the removal notification from the system manager circuitry of the storage processor within the quarantine time period.

In some arrangements, the data path circuitry of the storage processor receives the removal notification from the system manager circuitry of the storage processor within the quarantine time period. Additionally, updating the current state entry of the control structure includes changing the current state entry of the control structure from quarantined to removed to prevent further I/O operations from being processed using the drive path.

In some arrangements, the data path circuitry of the storage processor does not receive the removal notification from the system manager circuitry of the storage processor within the quarantine time period. Additionally, updating the current state entry of the control structure includes changing the current state entry of the control structure from quarantined back to online to enable further I/O operations to be processed using the drive path.

In some arrangements, the control circuitry is further constructed and arranged to increment a quarantined tally of the control structure. The quarantined tally indicates a number of times in a row that the current state entry of the control structure has transitioned between the online state and the quarantined state.

In some arrangements, the control circuitry is further constructed and arranged to, in response to the quarantined tally reaching a predefined tally threshold that is greater than 1, provide an alert notification and maintaining the current state entry of the control structure set to quarantined. Accordingly, the current state of the drive path will remain quarantined and a human administrator may attend to fixing the issue.

In some arrangements, the control circuitry is further constructed and arranged to generate a current count of consecutive I/O errors encountered using the drive path and comparing the current count of consecutive I/O errors to a consecutive I/O error threshold. Such operation determines whether the data path circuitry of the storage processor has encountered the predefined number of consecutive I/O errors using the drive path.

In some arrangements, the control circuitry is further constructed and arranged to detect an I/O error using another drive path to the storage drive, and in response to detecting the I/O error using the other drive path to the storage drive, resetting the current count of consecutive I/O errors using the drive path. Such operation ensures that quarantining occurs only in response to encountering consecutive I/O errors.

It should be understood that, in the cloud context, at least some of electronic circuitry such as that for a set of host computers is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in using path quarantining to identify and/or handle backend issues.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 5 is a block diagram of an example control structure utilized by the data storage equipment of FIG. 1 in accordance with certain embodiments.

DETAILED DESCRIPTION

An improved technique is directed to using path quarantining to identify and handle backend issues within a data storage environment. That is, storage processors may quarantine problematic paths long enough to determine where the backend issues lie. Along these lines, in the context of storage processing circuitry having a system manager component, a platform manager component, and a data path component, the data path component moves a problematic path from an online state to a quarantined state for a period of time. While the problematic path is in the quarantined state, normal I/O operations are not performed using that path. Such quarantining allows time (i) for the platform manager component to identify a reason for I/O failure using that path and communicate the reason to the system manager component, and (ii) for the system manager component to instruct the data path component to properly handle the I/O failure. Such operation prevents the data path component from prematurely indicting storage drives as the failing component thus prevent potential unnecessary service interruptions.

Figure 1:
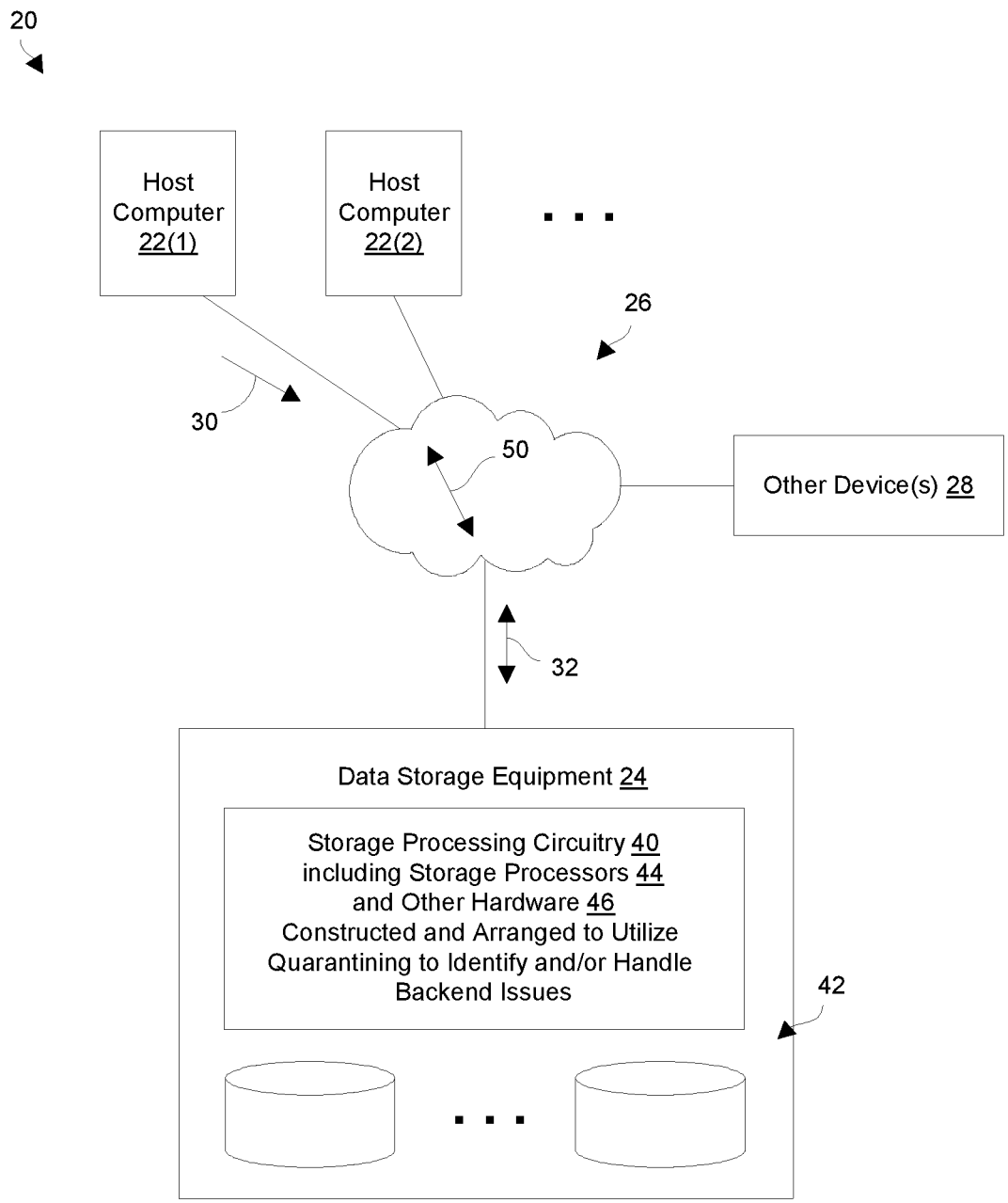
FIG. 1 is a block diagram of a data storage environment which uses path quarantining to identify and handle backend issues in accordance with certain embodiments.

FIG. 1 shows a data storage environment 20 which uses path quarantining to identify and handle backend issues in accordance with certain embodiments. The data storage environment 20 includes host computers 22(1), 22(2), . . . (collectively, host computers 22), data storage equipment 24, a communications medium 26, and perhaps one or more other devices 28.

Each host computer 22 is constructed and arranged to perform useful work. For example, one or more of the host computers 22 may operate as a file server, a web server, an email server, an enterprise server, a database server, a transaction server, combinations thereof, etc. which provides host input/output (I/O) requests 30 to the data storage equipment 24. In this context, the host computers 22 may provide a variety of different I/O requests 30 (e.g., block and/or file based write commands, block and/or file based read commands, combinations thereof, etc.) that direct the data storage equipment 24 to store data 32 within and retrieve data 32 from storage (e.g., primary storage or main memory, secondary storage or non-volatile memory, tiered storage, combinations thereof, etc.).

The data storage equipment 24 includes storage processing circuitry 40 and storage drives 42. The storage processing circuitry 40 is constructed and arranged to respond to the host I/O requests 30 from the host computers 22 by performing I/O operations on the storage drives 42 (e.g., write operations, read operations, etc.). The storage processing circuitry 40 may also perform I/O operations on the storage drives 42 for other purposes (e.g., metadata updates, compression, deduplication, storage tiering, snapshotting, backups, replication, configuration changes, performance monitoring, other background services, etc.). The storage processing circuitry 40 includes multiple storage processors (or nodes) 44 (e.g., separate storage processing circuits or engines, data movers, director boards, blades, hardware nodes/modules, etc.) and other hardware 46 (e.g., line cards, I/O modules, storage device controllers, switches, power converters, backplanes, midplanes, cables, connectors, and other hardware, combinations thereof, and so on). The storage drives 42 may include solid state drives, magnetic disk drives, optical media, tape media, combinations thereof, etc.

As will be explained in further detail shortly, the storage processing circuitry 40 may include multiple storage processors (i.e., separate processing circuits) where each storage processor is capable of accessing each storage drive 42 via multiple drive paths. Each storage processor maintains a current state for each drive path (e.g., online, removed, quarantined, removed, etc.) to indicate accessibility details to a particular storage drive 42 using that drive path.

The communications medium 26 is constructed and arranged to connect the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, WAN-based communications, distributed infrastructure communications, other topologies, combinations thereof, etc.

The other devices 28 represent other possible componentry of the data storage environment 20. For example, the other devices 28 may include remote data storage equipment that provides data 32 to and/or receives data 32 from the data storage equipment 24 (e.g., replication arrays, backup equipment, management devices, etc.).

During operation, the storage processing circuitry 40 of the data storage equipment 24 performs data storage operations to richly and robustly store data 32 with high responsiveness and reliability. Example storage configurations which are suitable for use by the data storage equipment 24 include traditional RAID configurations, mapped-RAID configurations, and so on.

During such operation, the storage processors 44 may encounter failures when attempting to perform I/O operations on the storage drives 42. Such a failure may be due to failure of a storage drive 42, a storage drive connector failure, a midplane or backplane connection failure, a disconnected or failed cable between enclosures, etc.

To enable the storage processors 44 to identify and handle particular backend issues within the data storage environment 20, the storage processors 44 are configured to use drive path quarantining in certain situations. Along these lines, suppose that a storage processor 44 encounters a predefined number of consecutive I/O errors (e.g., three, four, etc.) using a particular drive path to a particular storage drive 42. In such a situation, the storage processor 44 may transition a current state of the drive path from online to quarantined to temporarily deny further I/O operations from being processed using that drive path. That is, the storage processor 44 changes the current state of the drive path from the online state to the quarantined state.

It should be understood that the storage processors 44 may maintain a current count of consecutive I/O errors through each drive path in a routine manner (e.g., by updating control/status structures). If a storage processor 44 determines that the I/O errors are not consecutive (e.g., a successful I/O operation was performed between I/O errors), the storage processor 44 resets the current count of consecutive I/O errors.

Next, in response to a current count of consecutive I/O errors reaching the predefined number of consecutive I/O errors using the drive path, the storage processor 44 starts a quarantine timer that defines a quarantine time period. As will be explained in further detail below, the quarantine time period provides enough time for particular internal components of the storage processors 44 to properly assess the situation and, if necessary, prevent the particular storage drive 42 from being prematurely indicted in a manner that would unnecessarily cause service disruption/interruption.

Along these lines, with the quarantine timer now started, the storage processor 44 performs an update operation that updates the current state of the drive path based on whether it has been determined that the storage drive 42 should be removed. That is, the update operation changes the current state of the drive path from quarantined to removed (i.e., the removed state) to continue denying further I/O operations from being processed using the drive path when a removal notification is received for the drive path before the quarantine time period expires. However, the update operation changes the current state from quarantined to back to online to allow further I/O operations to be processed using the drive path when a removal notification is not received for the drive path before the quarantine time period expires. Further details will now be provided with reference to FIG. 2.

Figure 2:
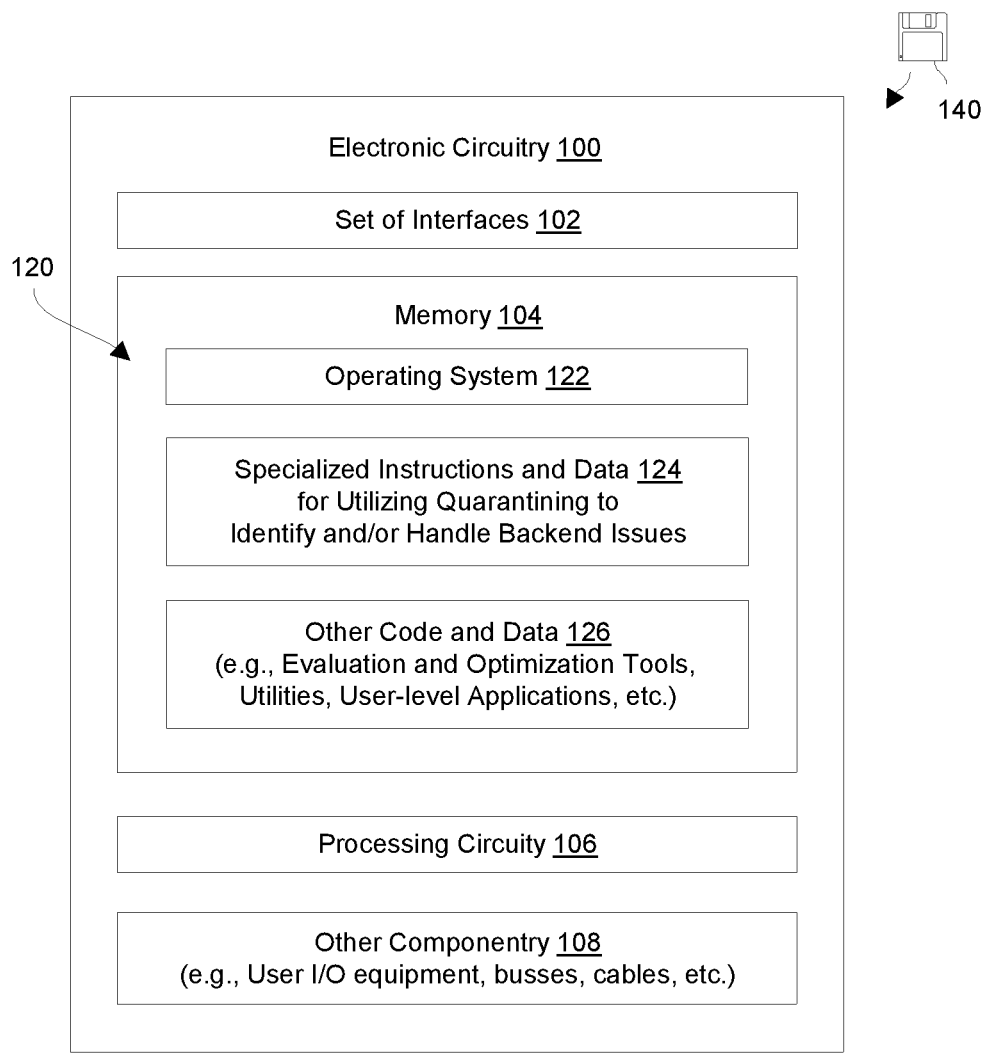
FIG. 2 is a block diagram of certain electronic circuitry of the data storage equipment of FIG. 1 in accordance with certain embodiments.

FIG. 2 shows, in accordance with certain embodiments, electronic circuitry 100 which is suitable for the storage processing circuitry 40 of the data storage equipment 24 (also see FIG. 1). The electronic circuitry 100 includes a set of interfaces 102, memory 104, and processing circuitry 106, and other circuitry 108.

The set of interfaces 102 is constructed and arranged to connect the electronic circuitry 100 to the communications medium 26 (also see FIG. 1) to enable communications with other devices of the data storage environment 20 (e.g., the host computers 22). Such communications may be IP-based, SAN-based, cellular-based, cable-based, fiber-optic based, wireless, cloud-based, combinations thereof, and so on. Accordingly, the set of interfaces 102 may include one or more host interfaces (e.g., a computer network interface, a fibre-channel interface, etc.), one or more storage device interfaces (e.g., a host adapter or HBA, etc.), and other interfaces. As a result, the set of interfaces 102 enables the electronic circuitry 100 to robustly and reliably communicate with other external apparatus.

The memory 104 is intended to represent both volatile storage (e.g., DRAM, SRAM, etc.) and non-volatile storage (e.g., flash memory, magnetic memory, etc.). The memory 104 stores a variety of software constructs 120 including an operating system 122, specialized instructions and data 124, and other code and data 126. The operating system 122 refers to particular control code such as a kernel to manage computerized resources (e.g., processor cycles, memory space, etc.), drivers (e.g., an I/O stack), and so on. The specialized instructions and data 124 refers to particular code for utilizing quarantining to identify backend issues. In some arrangements, the specialized instructions and data 124 is tightly integrated with or part of the operating system 122 itself. The other code and data 126 refers to applications and routines to provide additional operations and services (e.g., performance measurement tools, etc.), user-level applications, administrative tools, utilities, and so on.

The processing circuitry 106 is constructed and arranged to operate in accordance with the various software constructs 120 stored in the memory 104. As will be explained in further detail shortly, the processing circuitry 106 executes the operating system 122 and the specialized code 124 to form specialized circuitry that robustly and reliably manages host data on behalf of the host computers 22 (FIG. 1). Such processing circuitry 106 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 140 is capable of delivering all or portions of the software constructs 120 to the storage processing circuitry 106. In particular, the computer program product 140 has a non-transitory (or non-volatile) computer readable medium which stores a set of instructions that controls one or more operations of the electronic circuitry 100. Examples of suitable computer readable storage media include tangible articles of manufacture and apparatus which store instructions in a non-volatile manner such as DVD, CD-ROM, flash memory, disk memory, tape memory, and the like.

The other componentry 108 refers to other hardware of the electronic circuitry 100. Along these lines, the electronic circuitry 100 may include special user I/O equipment (e.g., a service processor), busses, cabling, adaptors, backplanes/midplanes, connectors, auxiliary apparatuses, a mechanism that enables a user to receive an alert, other specialized data storage componentry, etc.

It should be understood that portions of the storage processing circuitry 40 are configured into multiple storage processors 44, each of which is separately capable of performing I/O operations. Such a configuration provides for load balancing (e.g., distributing the I/O load among the storage processors 44 to reduce I/O latency) and fault tolerance (e.g., I/O operations may be performed by a second storage processor 44 even if a first storage processor 44 fails). Further details will now be provided with reference to FIG. 3.

Figure 3:
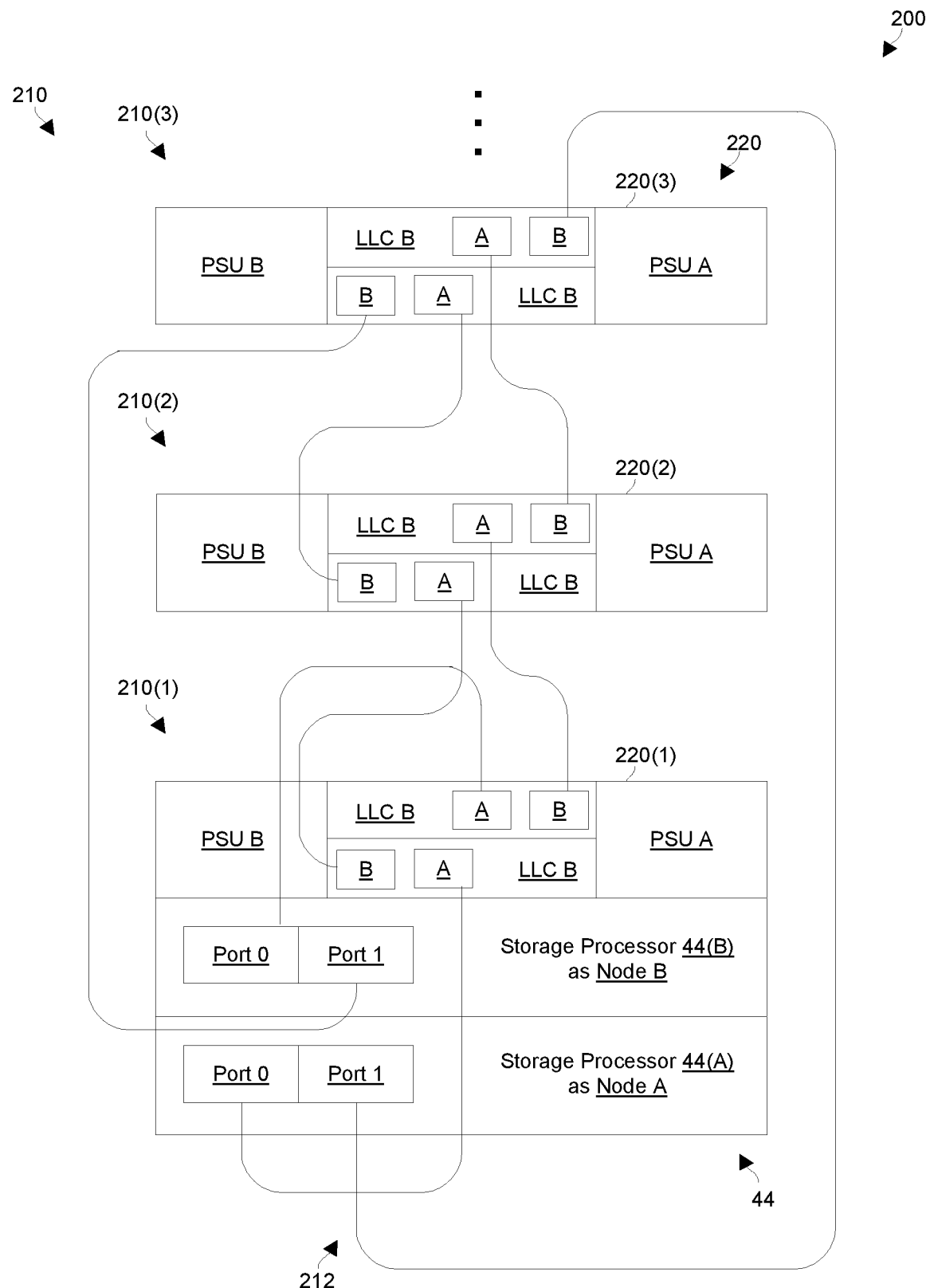
FIG. 3 is a block diagram illustrating certain details of an example layout for particular components of the data storage equipment of FIG. 1 in accordance with certain embodiments.

FIG. 3 shows particular details of an example layout 200 for the data storage equipment 24 (FIG. 1) in accordance with certain embodiments. In the example layout 200, the data storage equipment 24 includes storage enclosures 210(1), 210(2), 210(3) (collectively, storage enclosures 210) and cabling 212.

Such storage enclosures 210 may take a rack mount form factor making the enclosures 210 suitable for stacking on one or more equipment racks. Alternatively, such enclosures 210 may be positioned in other manners, e.g., freestanding, within one or more cabinets, combinations thereof, etc.

The storage enclosure 210(1) includes multiple storage processors 44(A), 44(B) (e.g., housed in respective chassis or housings), and a drive enclosure 220(1). The drive enclosure 220(1) holds multiple storage drives 42. In the rack mount context, the drive enclosure 220(1) may take the form of a disk array enclosure (DAE).

Each of the other storage enclosures 210(2), 210(3) simply holds a respective drive enclosure 220(2), 220(3) which holds multiple storage drives 42. In the rack mount context, the other drive enclosures 220(2), 220(3) may also take the form of DAEs.

For illustration purposes, each drive enclosure 220 is shown as including multiple link control cards (LCCs) where each LCC has multiple ports (A and B), and multiple power supplies units (PSUs). Each drive enclosure 220 further includes additional hardware which is omitted for simplicity such as midplanes (and/or backplanes), drive slots to receive drive carriers holding storage drives 42, fans, and so on.

It should be understood that the example layout 200 is shown as including three drive enclosures 220 for illustration purposes only. In other layouts which belong to other similar embodiments, the data storage equipment 24 includes a different number of drive enclosures 220 (e.g., one, two, four, and so on). In some arrangements, the size of the example layout 200 is easily changed (e.g., expanded, shrunk, etc.).

It should be further understood that certain details are provided in FIG. 3 to illustrate particular connectivity aspects of the data storage equipment 24. In particular and as mentioned earlier, each storage processor 44 has multiple drive paths to each storage drive 42. Accordingly, each storage processor 44 has multiple ports (e.g., port 0 and port 1) and multiple cable pathways to each drive enclosure 220 which provides multiple connections to each storage drive 42. Such cable pathways may include one or more cables 212, one or more LCCs, and so on.

During operation, the storage processors 44 perform I/O operations on the storage drives 42 which are contained within the drive enclosures 220. Along these lines, due to various redundancies, the storage processors 44 are able to access each storage drive 42 using multiple drive paths. Moreover, in the event of a failure (e.g., a failed storage drive 42, a failed midplane connection, a failed cable 212, etc.), the storage processors 44 are able to utilize quarantining to identify and/or handle backend issues. Further details will now be provided with reference to FIGS. 4 and 5.

Figure 4:
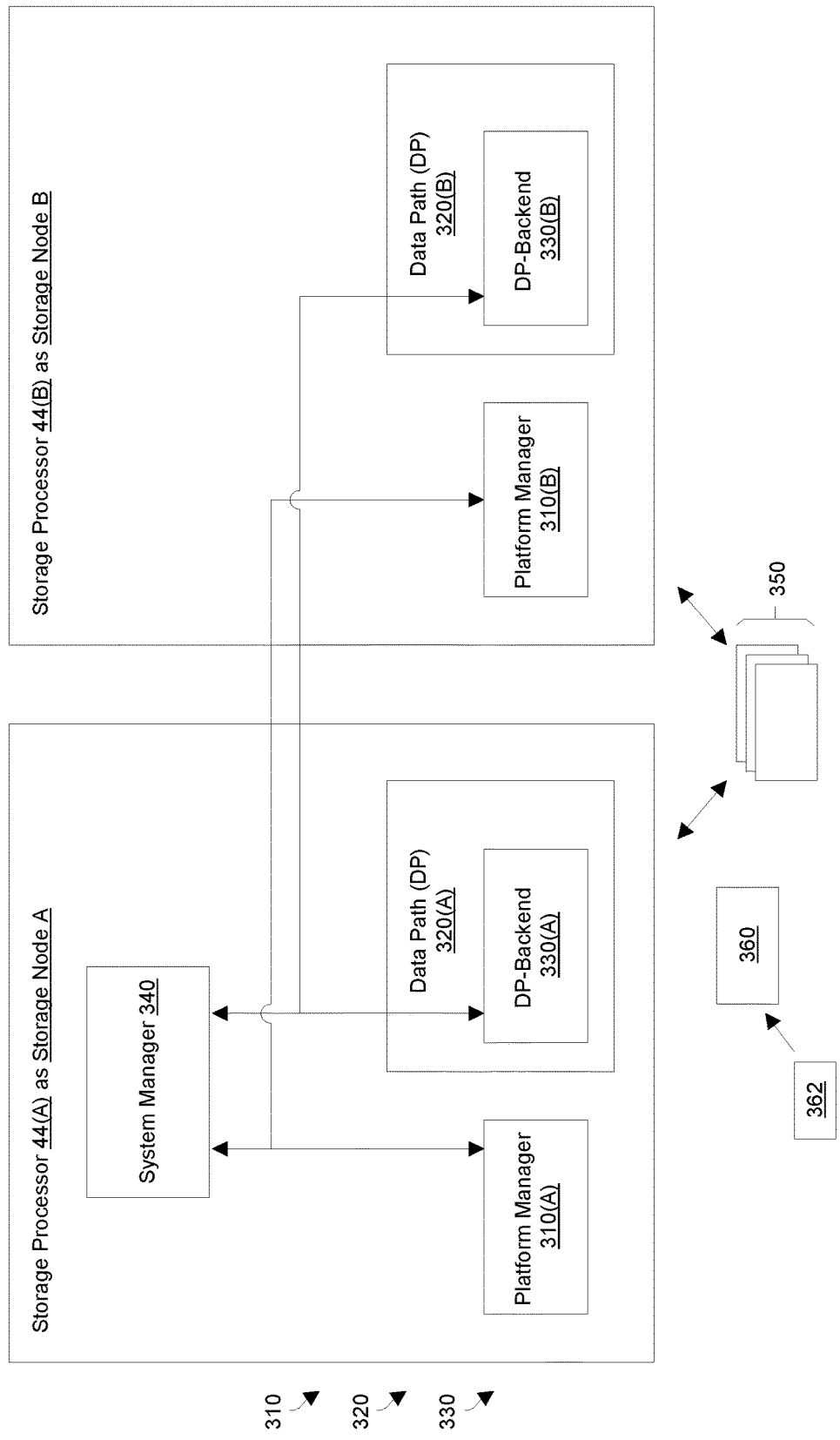
FIG. 4 is a block diagram of certain details of the data storage equipment of FIG. 1 in accordance with certain embodiments.

FIGS. 4 and 5 show particular operational details of the data storage equipment 24 in accordance with certain embodiments. FIG. 4 shows a configuration 300 for the storage processing circuitry 40 of the data storage equipment 24 in accordance with certain embodiments (also see FIGS. 1 through 3). FIG. 5 shows an example control/status structure that is maintained by the data storage equipment 24 in accordance with certain embodiments.

As shown in FIG. 4, the storage processing circuitry 40 includes storage processors 44(A) and 44(B) operating as storage nodes A and B, respectively. Each storage processor 44 includes a platform manager 310 and a data path component 320 having a data path backend 330. That is, the storage processor 44(A) includes a platform manager 310(A) and a data path component 320(A) having a data path backend 330(A). Likewise, the storage processor 44(B) includes a platform manager 310(B) and a data path component 320(b) having a data path backend 330(B).

The storage processing circuitry 40 further includes a system manager 340 that may move (or migrate) between the storage processors 44 (e.g., by failover in response to loss of a storage processor 44). By way of example, the storage processor 44(A) currently includes the system manager 340.

Each data path component 320 updates various path information 350 such as drive path states, cable path states, etc. Each data path component 320 further runs I/O error handling code (e.g., drive improved error handling or DIEH) in response to I/O operation failures (e.g., storage device errors, link errors, etc.).

Each platform manager 310 monitors for certain changes (e.g., new or removed storage drives, LCCs, etc.). Along these lines, a platform manager 320 may detect that previously existing storage drive 42 has been removed and/or a new storage drive 42 has been added in its place (e.g., swapped as field replaceable units or FRUs). Additionally, each platform manager 310 is designed to detect drive and path failures, then notify the system manager 340.

The system manager 340 aggregates information received from the platform managers 310 and, in response to certain problematic situations, takes corrective action. For example, the system manager 340 may send a notification (or issue a command) to a data path component 320 to remove a drive or path from the data path backend 330. To this end, the data path components 320 have access to the various control/status structures 350 that contain path information.

It should be understood that, in some arrangements, portions of DIEH may be distributed beyond the data path components 320 (e.g., reside within the system manager 340, reside within the platform manager 310, reside in another component, etc.). However, it should be understood that utilization of quarantining as disclosed herein may prevent certain portions of the DIEH within the data path components 320 from prematurely reacting (or overreacting) to certain I/O errors by providing additional time for the platform managers 310 and the system manager 340 to evaluate the I/O errors and inform the data path components 320 thus enabling the data path components 320 to properly respond to the I/O errors.

FIG. 5 shows, by way of example, a table 400 containing path information that is updated by a data path component 320. The table 400 may be a portion of the control/status structure 350 (FIG. 4). The table 400 includes current state entries 410(1), 410(2), 410(3), 410(4), . . . (collectively, current state entries 410) corresponding to the drive paths that are accessible via a data path component 320.

Each current state entry 410 includes a drive path identifier field 420 to hold a drive path identifier or descriptor that uniquely identifies a drive path, a current state field 430 to hold a value indicating a current state of the drive path identified in the drive path identifier field 420. Each current state entry 410 may further include other fields 440 that hold other information such as a storage drive identifier that identifies a particular storage drive 42 accessed using the drive path, error counts, timestamps, and so on. In some arrangements, the table 400 represents combined portions of other structures and/or constructs that are maintained by the storage processing circuitry 40.

By way of example, suppose that the data path component 320(A) detects N number of consecutive I/O failures for a storage drive 42 on a particular drive path 003 (see the current state entry 410(3) in the table 400 of FIG. 5). Rather than prematurely indict the storage drive 42 accessed by the drive path 003 due to minimum error information returned by the I/O failures, the data path component 320(A) transitions the current state of the drive path from online to quarantined for a predefined amount of time. That is, the data path component 320(A) updates the current state field 430 of the entry 430(3) to indicate that the drive path 003 is now in the quarantined state. The data path component 320(A) maintains the drive path 003 in the quarantined state until the system manager 340 (FIG. 4) notifies or commands the data path component 320 to update the current state or until a quarantined timer expires.

Such quarantining provides enough time for the platform manager 310(A) to diagnose the cause of the I/O failures (i.e., a first amount of time) such as a failed cable, a failed storage drive connector, a failed storage drive, etc. In some embodiments, at least part of this process involves the platform manager 310(A) polling file descriptors (e.g., udev provided by the kernel) periodically (e.g., once a second).

Such quarantining further provides enough time for the platform manager 310(A) to evaluate and report the cause to the system manager 340 (i.e., a second amount of time). Recall that the system manager 340 may or may not be in the same storage processor 44 as the platform manager 310(A) (e.g., the system manager could be in the storage processor 44(B)).

Such quarantining further provides enough time for the system manager 340 to notify the data path component 320(A) to take appropriate action (i.e., a third amount of time). Again, the system manager 340 may or may not be in the same storage processor 44 as the data path component 320(A). If the data path component 320(A) receives notification from the system manager 340 before the quarantined timer expires, the data path component 320(A) removes the drive path from the data path backend 330. However, if the data path component 320(A) does not receive notification from the system manager 340 before the quarantined timer expires, the data path component 320(A) simply transitions the current state of the drive path back to online.

Accordingly, the predefined amount of time may be set to the worst case amount of time that it would take for the platform managers 310 and the system manager 340 to properly coordinate a notification to the data path components 320. In order to impose the predefined amount of time, each data path component 320 may utilize a quarantine timer 360 that measures a predefined quarantined time period 362. There are a variety of ways to implement the quarantine timer 360 such as by using a clock that increments or decrements, calculating timestamp deltas between the time of error detection and current time, and so on.

An example amount of time for the predefined quarantined time period 362 is 60 seconds. However, other amounts of time are suitable for use as well (e.g., 30 seconds, 45 seconds, 90 seconds, etc.) depending on the worst case scenario for a platform manager 310 to detect and report an problem to the system manager 340 and for the system manager 340 to then send a command (or notification) to the data path component 320. Moreover, the predefined quarantined time period 362 may be adjusted, tuned, updated, etc. over time.

In accordance with certain embodiments, if the data path component 320 transitions the path state between online and quarantined a predefined number of times in a row, the data path component 320 provides an alert notification (e.g., to a user) and maintains the current state set to quarantined. In some arrangements, the predefined number of times is three, although the number may be other values (e.g., two, four, five, etc.) in other arrangements. The current count of transitions between online and quarantined may be stored as a quarantined tally (also see the fields 440 in the current state entries 410 in FIG. 5). If the number of path state transitions between online and quarantined reaches the predefined number of times, it is determined that the failure is due to the storage drive 42 and thus requires human intervention. Further details will now be provided with reference to FIG. 6.

Figure 6:
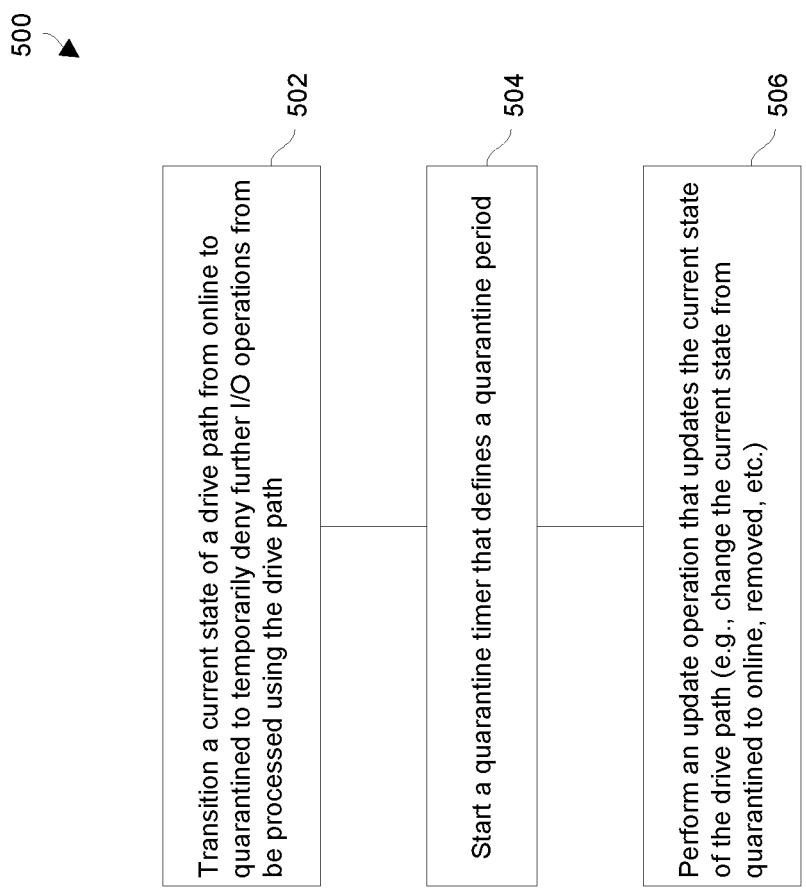
FIG. 6 is a flowchart of a procedure which is performed by circuitry of the data storage equipment of FIG. 1.

FIG. 6 shows a procedure 500 which is performed by the data path component 320 of a storage processor 44 when controlling access to a storage drive 42 using a quarantined state. It should be understood that the data path component 320 is capable of performing the procedure 500 for multiple drive paths simultaneously.

At 502, the data path component 320 transitions a current state of a drive path to the storage drive 42 from online to quarantined in response to encountering a predefined number of consecutive input/output (I/O) errors using that drive path. Such quarantining temporarily denies further I/O operations from being processed using that drive path.

At 504, the data path component 320 starts a quarantine timer that defines a quarantine time period. As explained earlier, the quarantine time period provides sufficient time for the platform manager 310 of the storage processor 44 and the system manager 340 to properly ascertain the cause of the I/O failures and communicate direction to the data path component 320.

At 506, the data path component 320 performs an update operation that updates the current state of the drive path. In particular, if the data path component 320 receives a removal notification for the drive path from the system manager 340 before the quarantine time period expires, the data path component 320 changes the current state of the drive path to removed (or offline). However, if the data path component 320 does not receive a removal notification for the drive path from the system manager 340 before the quarantine time period expires, the data path component 320 changes the current state of the drive path to back to online. Such operation provide time for the platform managers 310 and the system manager 340 to evaluate the I/O errors and properly inform the data path components 320 thus enabling the data path components 320 to correctly respond to the I/O errors.

As described above, improved techniques are directed to using path quarantining to identify and/or handle backend issues. That is, storage processors 44 may quarantine problematic paths long enough to determine where the issues lie. While the problematic path is in the quarantined state, normal I/O operations are not performed using that path. Such quarantining allows time (i) for the platform manager component 310 to identify a reason for I/O failure using that path and communicate the reason to the system manager 340, and (ii) for the system manager 340 to instruct the data path component 320 to properly handle the I/O failure. Such operation prevents the data path component 320 from prematurely indicting storage drives 42 as the failing component thus avoiding possible unnecessary service interruptions.

One should appreciate that the above-described techniques do not merely provide state management to storage drives. Rather, the disclosed techniques involve improving the technology by providing a mechanism that enables components within storage processors 44 to reliably coordinate operation and thus avoid unnecessary service interruption.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that the particular techniques disclosed herein are superior to an approach of simply adjusting DIEH error handling thresholds high enough to tolerate I/O errors due to path failures. In such an simplified approach, the number of I/Os being sent by the data path and the path monitoring performed by the platform manager would not be deterministic. Accordingly, the approach has no way to accurately determine DIEH thresholds which would then result in various failures.

For example, during backend end cable disconnection or failures, the DIEH would indict drives as the failing component. If the DIEH ends up taking recovery actions on all drives on a failed path, such recovery actions may result in other failures. Such possible failures include fencing off a node, system manager failover, a DU/DL event if multiple drives get marked as failed, etc.

However, in accordance with certain embodiments, I/O error handling with respect to path failures in a topology with chained DAEs (e.g., see FIG. 3) is more effective and will avoid service interruption. Here, enclosure chaining is designed to have two redundant paths (cables) for each chained DAE. If one path fails, it's expected to have all I/Os sent down the alternate path without any host impact.

In accordance with certain embodiments, the techniques take into consideration the following possible failure scenarios among others:
  Drive single port failure
  Drives failure that mimics a path failure
  Cable pull/failure
  Flaky (bouncing) cable
Such embodiments utilize a platform manger (PM) on each node which monitors the hardware (e.g., FRUs) which include LCCs and drives. It's designed to detect drive and path failures, then notify the system manger (SYM). The SYM will then take a corrective action such as removing the drive or path from the data path (DP) component's DP-Backend.

It should be understood that the PM may operate based on polling and, without quarantining, there may be no guarantee of notifying the DP-Backend quickly enough before the DIEH error handling indicts a drive.

However, with quarantining, when N number of consecutive I/O errors are detected for a drive, the DP is able to remove that drive's path temporarily by setting the path's state to quarantined. The time in quarantine is set to be greater than the worst case for PM monitoring to notify the SYM, and then for the SYM to instruct the DP-Backend. While in quarantine, if the SYM notifies the DP-Backend of a path failure, the DP will change the path state from quarantined to removed. If no SYM notification is sent within the quarantine timeout period, then the path state will transition back to online.

In accordance with certain embodiments, if I/O errors are not consecutive, then the node understands that the I/O errors are not due to a path failure. Rather, the storage drive is still returning successful IO.

In accordance with certain embodiments, if the DP transitions a path state back to online, then the errors must be related to a storage drive because the quarantine timeout is greater that the worst-case time for the PM and the SYM to detect and report the failure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

For example, the storage processing circuitry 40 was described above an including two storage processors 44 by way of example. In other arrangements, the storage processing circuitry 40 includes a different number of storage processors 44 (e.g., three, four, etc.). Moreover, nothing precludes the storage processors 44 or a portion of the storage processors 44 from being implemented as virtual storage processors or virtual data movers.

As another example, the storage drives 42 were described above as including two ports by way of example. However, one or more of the storage drives 42 may include a different number of ports (e.g., three, four, etc.). Moreover, nothing precludes the storage drives 42 or a portion of the storage drives 42 from being implemented virtually. Such modifications and enhancements are intended to belong to various embodiments of the disclosure.

What is claimed is:

1. In a storage processor, a method of controlling access to a storage drive using a quarantined state, the method comprising:
  in response to encountering a predefined number of consecutive input/output (I/O) errors using the drive path to the storage drive, transitioning a current state of the drive path from online to quarantined to temporarily deny further I/O operations from being processed using the drive path;
  in response to transitioning the current state from online to quarantined, starting a quarantine timer that defines a quarantine time period; and
  after the quarantine timer is started, performing an update operation that updates the current state of the drive path, the update operation (i) changing the current state of the drive path from quarantined to removed to continue denying further I/O operations from being processed using the drive path when a removal notification is received for the drive path before the quarantine time period expires, and (ii) changing the current state from quarantined to back to online to allow further I/O operations to be processed using the drive path when a removal notification is not received for the drive path before the quarantine time period expires.

2. A method as in claim 1 wherein transitioning the current state of the drive path from online to quarantined includes:

setting, by data path circuitry of the storage processor, a current state entry of a control structure to quarantined, the data path circuitry being permitted to process I/O operations using the drive path when the current state entry of the control structure is set to online and the data path circuitry not being permitted to process I/O operations using the drive path when the current state entry of the control structure is not set to online.

3. A method as in claim 2 wherein starting the quarantine timer that defines the quarantine time period includes:

setting, by the data path circuitry of the storage processor, the quarantine timer to cover (i) a first amount of time for platform management circuitry of the storage processor to determine whether the drive path failed due to a failed storage drive or a failed link, (ii) a second amount of time for the platform management circuitry of the storage processor to provide a notification to system manager circuitry of the storage processor which communicates with both the data path circuitry of the storage processor and other data path circuitry of another storage processor, and (iii) a third amount of time for the system manager circuitry of the storage processor to provide the removal notification to the data path circuitry before the quarantine time period expires.

4. A method as in claim 3 wherein performing the update operation that updates the current state of the drive path includes:

updating, by the data path circuitry of the storage processor, the current state entry of the control structure based on whether the data path circuitry of the storage processor received the removal notification from the system manager circuitry of the storage processor within the quarantine time period.

5. A method as in claim 4 wherein the data path circuitry of the storage processor receives the removal notification from the system manager circuitry of the storage processor within the quarantine time period; and wherein updating the current state entry of the control structure includes:

changing the current state entry of the control structure from quarantined to removed to prevent further I/O operations from being processed using the drive path.

6. A method as in claim 4 wherein the data path circuitry of the storage processor does not receive the removal notification from the system manager circuitry of the storage processor within the quarantine time period; and wherein updating the current state entry of the control structure includes:

changing the current state entry of the control structure from quarantined back to online to enable further I/O operations to be processed using the drive path.

7. A method as in claim 6, further comprising:

incrementing a quarantined tally of the control structure, the quarantined tally indicating a number of times in a row that the current state entry of the control structure has transitioned between the online state and the quarantined state.

8. A method as in claim 7, further comprising:

in response to the quarantined tally reaching a predefined tally threshold that is greater than 1, providing an alert notification and maintaining the current state entry of the control structure set to quarantined.

9. A method as in claim 4, further comprising:

generating a current count of consecutive I/O errors encountered using the drive path and comparing the current count of consecutive I/O errors to a consecutive I/O error threshold to determine whether the data path circuitry of the storage processor has encountered the predefined number of consecutive I/O errors using the drive path.

10. A method as in claim 9, further comprising:

detecting an I/O error using another drive path to the storage drive, and in response to detecting the I/O error using the other drive path to the storage drive, resetting the current count of consecutive I/O errors using the drive path.

11. Data storage equipment, comprising:

a set of storage processors, each storage processor including memory, and control circuitry coupled to the memory, the memory storing instructions which, when carried out by the control circuitry, cause the control circuitry to:

in response to encountering a predefined number of consecutive input/output (I/O) errors using a drive path to a storage drive, transition a current state of the drive path from online to quarantined to temporarily deny further I/O operations from being processed using the drive path, in response to transitioning the current state from online to quarantined, start a quarantine timer that measures a quarantine time period, and after the quarantine timer is started, perform an update operation that updates the current state of the drive path, the update operation (i) changing the current state from quarantined to removed to continue denying further I/O operations from being processed using the drive path when a removal notification is received for the drive path before the quarantine time period expires, and (ii) changing the current state from quarantined to back to online to allow further I/O operations to be processed using the drive path when a removal notification is not received for the drive path before the quarantine time period expires.

12. Data storage equipment as in claim 11, further comprising: a plurality of storage drives which couples to the set of storage processors;

wherein the set of storage processors includes at least two storage processors, each storage processor having at least two drive paths to each storage drive of the plurality of storage drives.

13. Data storage equipment as in claim 12, further comprising:

a set of host computer interfaces which couples to the set of storage processors;

wherein the set of storage processors is constructed and arranged to store host data within the plurality of storage drives on behalf of a set of host computers that communicate with the set of storage processors through the set of host computer interfaces.

14. A computer program product having a non-transitory computer readable medium which stores a set of instructions to control access to a storage drive using a quarantined state; the set of instructions, when carried out by storage processing circuitry, causing the storage processing circuitry to perform a method of:

in response to encountering a predefined number of consecutive input/output (I/O) errors using the drive path to the storage drive, transitioning a current state of the drive path from online to quarantined to temporarily deny further I/O operations from being processed using the drive path;

in response to transitioning the current state from online to quarantined, starting a quarantine timer that measures a quarantine time period; and after the quarantine timer is started, performing an update operation that updates the current state of the drive path, the update operation (i) changing the current state from quarantined to removed to continue denying further I/O operations from being processed using the drive path when a removal notification is received for the drive path before the quarantine time period expires, and (ii) changing the current state from quarantined to back to online to allow further I/O operations to be processed using the drive path when a removal notification is not received for the drive path before the quarantine time period expires.

\* \* \* \* \*